United States Patent [19]
Hong et al.

[11] Patent Number: 5,557,056
[45] Date of Patent: Sep. 17, 1996

[54] PERFORMANCE EVALUATOR FOR USE IN A KARAOKE APPARATUS

[75] Inventors: Jae-Gyoo Hong; Ul-Je Kim, both of Seoul, Rep. of Korea

[73] Assignee: Daewoo Electronics Co., Ltd., Seoul, Rep. of Korea

[21] Appl. No.: 310,442

[22] Filed: Sep. 22, 1994

[30] Foreign Application Priority Data

Sep. 23, 1993 [KR] Rep. of Korea ............... 93-19444

[51] Int. Cl.⁶ .................... G09B 15/02; G10H 1/36
[52] U.S. Cl. ................ 84/610; 84/634; 84/477 R
[58] Field of Search ............... 84/601, 602, 609–614, 84/634–638, 477 R, 478

[56] References Cited

U.S. PATENT DOCUMENTS

| | | | |
|---|---|---|---|
| 4,546,687 | 10/1985 | Minami | 84/601 |
| 5,208,413 | 5/1993 | Tsumura et al. | 84/610 X |
| 5,250,745 | 10/1993 | Tsumura | 84/609 X |
| 5,395,123 | 3/1995 | Kondo | 84/615 X |
| 5,434,949 | 7/1995 | Jeong | 84/477 R X |

*Primary Examiner*—Stanley J. Witkowski
*Attorney, Agent, or Firm*—Anderson Kill Olick & Oshinsky, P.C.

[57] ABSTRACT

A karaoke apparatus evaluates a singer's performance by employing: a microphone for converting the singer's voice into a electrical voice signal; a first analogue to digital (A/D) converter for converting the electrical voice signal into a digitized voice signal; a audiovisual equipment for producing the accompanying music; a second A/D converter for digitizing the accompanying music to produce a digitized accompaniment signal; and a performance evaluator for measuring the difference between the accompanying music and the corresponding karaoke singer's voice to produce a score for the karaoke singer's singing performance.

5 Claims, 2 Drawing Sheets

5,557,056

PERFORMANCE EVALUATOR FOR USE IN A KARAOKE APPARATUS

FIELD OF THE INVENTION

The present invention relates to a karaoke apparatus; and, more particularly, to an improved karaoke apparatus with a performance evaluator capable of computing a score based on the singing performance of a karaoke singer.

DESCRIPTION OF THE PRIOR ART

A recent fad called "karaoke" in oriental countries, e.g., Korea and Japan, has experienced a phenomenal growth, wherein a karaoke singer sings to an orchestral accompaniment of a selected popular song while various scenes are displayed on a screen allowing an illusory stage performance of the "amateur" singer with a complete orchestral accompaniment.

As is well known, a typical karaoke apparatus capable of providing the aforementioned karaoke environment includes a microphone for the singer and an audiovisual equipment which produces the accompaniment and the various scenes. It is natural that many a singer desires to have their performance measurement after singing a selected music piece. In order to satisfy such desire as well as provide an additional amusement element, the typical karaoke apparatus is further equipped with a performance evaluator including a ROM (Read Only Memory) and a display.

The performance evaluator employed in the existing karaoke apparatus normally contains pre-recorded scores on the ROM. Upon the selection of a particular song, the performance evaluator is activated by the transmission accompanying music thereto. Thereafter, when the accompanying music ends, the performance evaluator randomly selects any one of the pre-recorded scores and transmits the selected score to the display.

However, because the score is entirely unrelated to the actual performance or singing ability of the karaoke singer, the scoring system is not only unreliable but also fails to enhance the entertainment level of the karaoke apparatus.

SUMMARY OF THE INVENTION

It is, therefore, a primary object of the present invention to provide an improved karaoke apparatus having a performance evaluator capable of generating an objective and rationalized performance score by measuring the incongruity between an accompanying music and its corresponding karaoke singer's singing.

In accordance with the present invention, there is provided an improved karaoke apparatus capable of evaluating the singing performance of a karaoke singer by measuring the incongruity between an accompanying music and a corresponding karaoke singer's rendition, which comprises: a microphone for converting the singer's rendition into an electrical voice signal; a first analogue to digital(A/D) converter for converting the electrical voice signal into a digitized voice signal; an audiovisual equipment for producing the accompanying music; a second A/D converter for digitizing the accompanying music to produce a digitized accompaniment signal; and a performance evaluator for measuring the difference between the accompanying music and the singer's rendition to produce a score for the singer's rendition.

BRIEF DESCRIPTION OF THE DRAWINGS

The above and other objects and features of the present invention will become apparent from the following description given in conjunction with the accompanying drawings, in which.

DETAILED DESCRIPTION OF THE PREFERRED EMBODIMENTS

Figure 1:
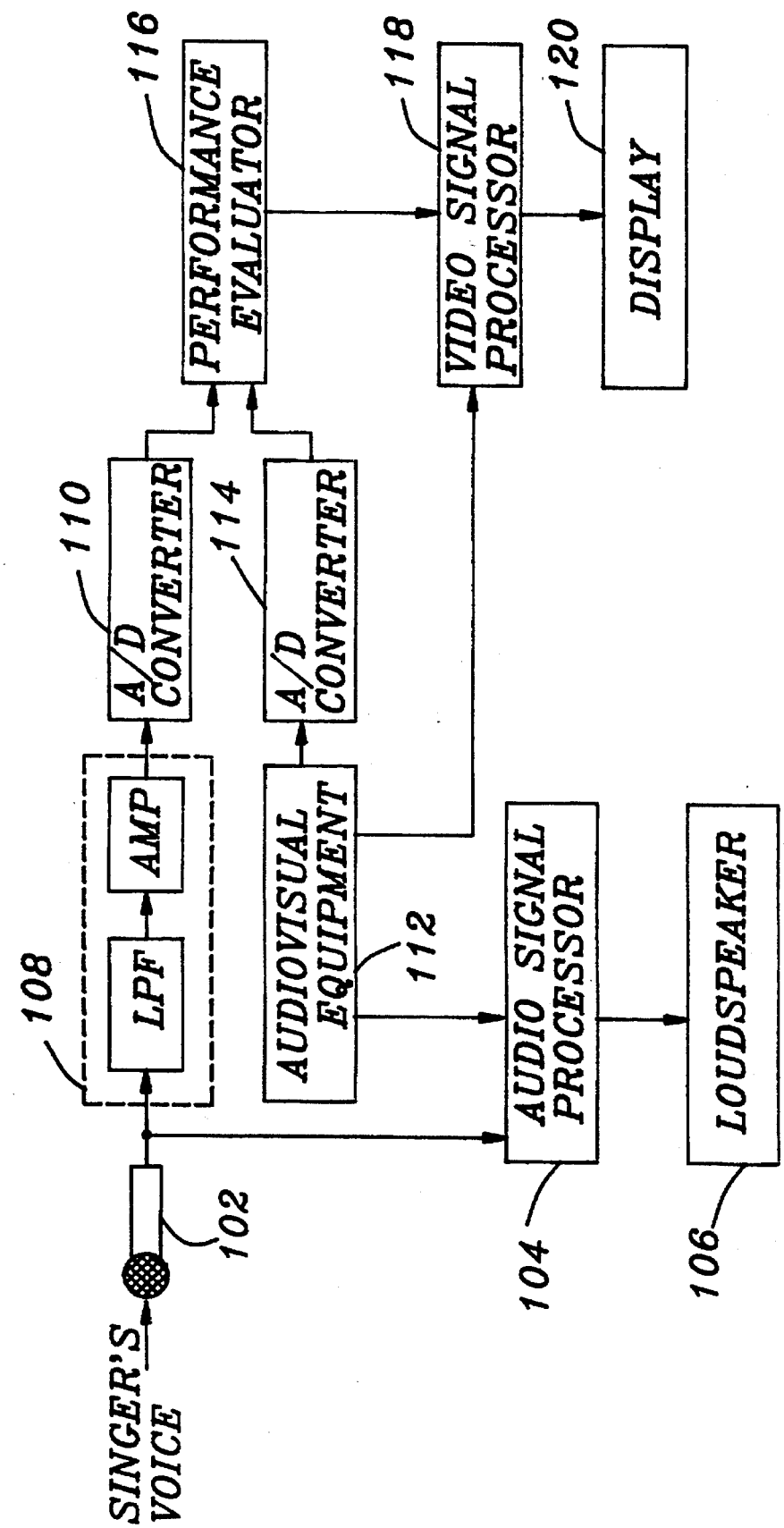
FIG. 1 shows a simplified block diagram of an inventive karaoke apparatus for evaluating the singing performance of a karaoke singer.

Referring to FIG. 1, there is shown a block diagram of an improved karaoke apparatus for evaluating the singing performance of a karaoke singer in accordance with the present invention. The karaoke apparatus, as shown, comprises a microphone 102, an audiovisual equipment 112, a loudspeaker 106 and a display 120. The audiovisual equipment 112 incorporated into the karaoke apparatus is equipped with the capability of selecting any one of various kinds of songs such as a popular song, a folk song and so on through the use of an appropriate selection means and providing an accompanying music and a background scene for the selected song to the loudspeaker 106 and a video signal processor 118, respectively. The verses or words of the selected song may be displayed on a screen together with the background scene through the video signal processor 118, permitting the singer to follow the words while singing.

A singer's voice is converted into an electrical voice signal by the microphone 102. The electrical voice signal is supplied to both an audio signal processor 104 and a preprocessor 108, which consists of a LPF(low pass filter) and an AMP(amplifier).

Meanwhile, the accompaniment generated by the audiovisual equipment 112 is forwarded to both the audio signal processor 104 and an A/D converter 114. In the audio signal processor 104, the electrical voice signal is processed along with the accompaniment. The output from the audio signal processor 104 is provided to the loudspeaker 106. The loudspeaker 106 together with the display 120 serves to allow the singer to hear his own voice accompanied by the orchestra while viewing background or staged scene and the words provided from the video signal processor 118.

On the other hand, the electrical voice signal from the microphone 102 supplied to the preprocessor 108 is filtered and amplified by the LPF and the AMP. Subsequently, the output of the preprocessor 108 is transmitted to an A/D converter 110, which digitizes the output of the preprocessor 108 to produce a digitized voice signal. Then the digitized voice signal is sent to one input of a performance evaluator 116 in accordance with the present invention.

In the meantime, the accompaniment from the audiovisual equipment is converted by the A/D converter 114 into a digitized accompaniment, which is provided to another input of the performance evaluator 116. Thereafter, the performance evaluator 116 begins a performance evaluation process of comparing the digitized voice signal against the digitized accompaniment signal to produce a score and provide the resultant score to a display 120. Hereinafter, the operation of the performance evaluator 116 of the present invention will be more fully described with reference to FIG. 2.

Figure 2:
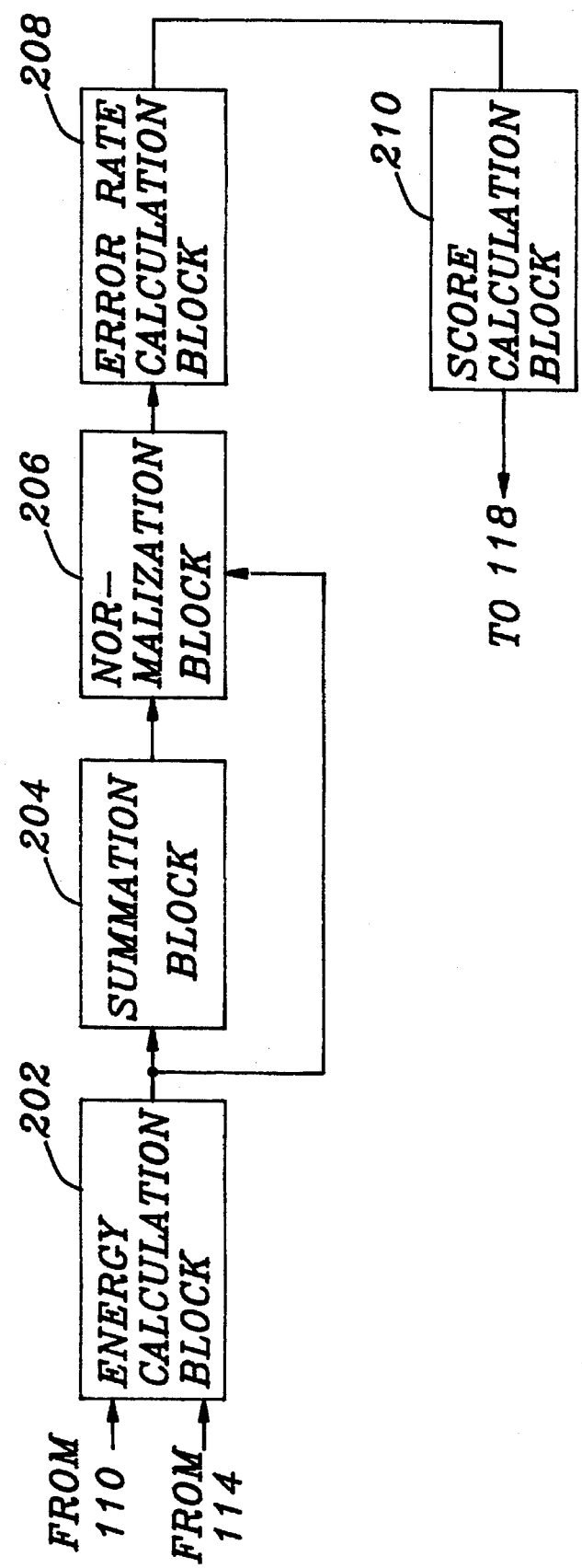
FIG. 2 illustrates a detailed block diagram of the performance evaluator shown in FIG. 1.

Referring to FIG. 2, there is illustrated a block diagram, in accordance with the present invention, of the performance evaluator shown in FIG. 1. The digitized voice signal and the digitized accompaniment signal are forwarded to an energy calculation block 202 of the performance evaluator 116, respectively, and the digitized voice signal as well as the digitized accompaniment signal is divided into n groups, wherein each of said n groups contains a predetermined number of digitized signals. The energy calculation block 202, first of all, serves to calculate an energy for each of the n groups of the digitized accompaniment and voice signals to produce n voice energies for the n groups of the digitized voice signal, E1(n), and n accompaniment energies for the n groups of the digitized accompaniment signals, E2(n).

As is well known in the art, the energy can be obtained as:

$$E(n) = \sum_{m=1}^{M} [x(m) \cdot w(N \cdot n - m)]^2 \qquad \text{Eq. 1}$$

$w(k)=1$, where $0 \leq k \leq N-1 = 0$, otherwise wherein E(n) represents the energy for the nth group of a predetermined number of digitized subsignals, n ranging from 1 to D, D=M//N, M representing the number of digitized voice subsignals or accompaniment subsignals, respective total, N being the predetermined number of the digitized subsignals included in each of the n groups of the digitized voice or accompaniment signals, and the "//" notation symbolizes an integer division with rounding to a nearest integer; x(m) is a digital value of the voice or the accompaniment subsignals in each group, with m=1, 2, ..., M; and w(k) is a window function, where k=0, 1, 2, ..., N−1.

Subsequently, the energies, E1(n) and E2(n), are transmitted to a summation block 204 and a normalization block 206. The summation block 204 performs the summation of the E1(n) energies and the E2(n) energies to produce a total sum of the n voice energies, ET1, and a total sum of the n accompaniment energies, ET2, respectively. The total voice sum, ET1, is obtained as:

$$ET1 = \sum_{n=1}^{D} E1(n) \qquad \text{Eq. 2}$$

wherein n and D have the same meanings as previously defined. The total accompaniment sum, ET2, is also similarly determined. The ET1 and ET2 are provided to the normalization block 206.

In accordance with the present invention, a normalization process for the n voice energies is performed to ensure an objective and accurate evaluation of the singer's performance.

Therefore, the normalization block 206 normalizes each of the n voice and the n accompaniment energies transmitted from the energy calculation block 202 through the use of ET1 and ET2 as:

$$E1'(n) = \frac{E1(n)}{ET1} \qquad \text{Eq. 3}$$

$$E2'(n) = \frac{E2(n)}{ET2}$$

wherein E1'(n) and E2'(n) represent the nth normalized voice and accompaniment energies, respectively. Subsequently, all of the normalized voice and accompaniment energies are sent to the error rate calculation block 208 which computes an error rate between the karaoke singer's voice and the accompanying music, Er, as:

$$Er = \sum_{n=1}^{D} |E1'(n) - E2'(n)| \qquad \text{Eq. 4}$$

The error rate, ultimately, represents the incongruity between the karaoke singer's voice and the accompanying music. The computed error rate is then provided to a score calculation block 210 wherein the score is computed as:

$$S = 60 + 40(1 - Er) \qquad (5)$$

Finally, the score, S, is sent to the display 120 through the video signal processor 118 so that the singer confirms his own score.

While the present invention has been shown and described with reference to the particular embodiments, it will be apparent to those skilled in the art that many changes and modifications may be made without departing from the spirit and scope of the invention as defined in the appended claims.

What is claimed is:

1. A karaoke apparatus capable of evaluating the singing performance of a karaoke singer by measuring the incongruity between an accompanying music and the karaoke singer's rendition to the accompanying music, which comprises:

a microphone for converting the singer's rendition into an electrical voice signal;

a first analog to digital converter (A/D) converter for converting the electrical voice signal into a digitized voice signal;

an audiovisual equipment for producing the accompanying music;

a second A/D converter for digitizing the accompanying music to produce a digitized accompaniment signal;

a performance evaluator for measuring the difference between an energy distribution of the digitized voice signal and that of the digitized accompaniment signal to thereby evaluate the karaoke singer's singing performance, wherein said performance evaluator includes:

means for dividing the digitized voice signal and the digitized accompaniment signal into n groups, respectively, wherein each group contains a predetermined number of digitized subsignals, and calculating an energy for each of the n groups of the digitized voice and the accompaniment subsignals to produce n voice energies and n accompaniment energies, respectively;

means for summing the n voice energies and the n accompaniment energies to produce a voice energy sum and an accompaniment energy sum, respectively;

means for normalizing each of the n voice energies and each of the n accompaniment energies through the use of the voice energy sum and the accompaniment energy sum, respectively;

means for producing an error rate by measuring the difference between each of the normalized n voice energies and each of the normalized n accompaniment energies; and means for calculating a score of the singer's singing performance on a basis of the error rate.

2. The apparatus as recited in claim 1, wherein each of the voice and accompaniment energies is calculated as:

$$E(n) = \sum_{m=1}^{M} [x(m) \cdot w(N \cdot n - m)]^2$$

$w(k)=1$, where $0 \leq k \leq N-1 = 0$, otherwise wherein E(n) represents the voice or accompaniment energy for the nth group of the predetermined number of digitized subsignals, n ranging from 1 to D, D=M//N, M representing the total number of the digitized voice or accompaniment subsignals, N being the predetermined number of the digitized subsignals included in each of the n groups of the voice or the accompaniment signal, and the "//" notation symbolizes an integer division with rounding to a nearest integer; x(m) is a digital value of the voice or the accompaniment subsignals in each group, with m=1, 2, . . . , M; and w(k) is a window function, with k=0, 1, 2, . . . , N−1.

3. The apparatus of claim 2, wherein said error rate, Er, is calculated as:

$$Er = \sum_{n=1}^{D} |E1'(n) - E2'(n)|$$

wherein E1'(n) represents the nth group of the normalized voice energies and E2'(n) the nth group of the normalized accompaniment energies; and n and D have the same meanings as previously defined.

4. The apparatus of claim 3, wherein said singing performance, S, is measured by the formula of:

$$S=60+40(1-Er)$$

5. The karaoke apparatus of claim 4, wherein said apparatus further comprises a display means for displaying the calculated score.

* * * * *